(12) United States Patent
Kang et al.

(10) Patent No.: US 11,373,366 B2
(45) Date of Patent: Jun. 28, 2022

(54) METHOD FOR IMPROVING MODELING SPEED OF DIGITAL SLIDE SCANNER

(71) Applicant: MOTIC CHINA GROUP CO., LTD., Fujian (CN)

(72) Inventors: Jun Kang, Fujian (CN); Shouli Jia, Fujian (CN); Muwang Chen, Fujian (CN)

(73) Assignee: MOTIC CHINA GROUP CO., LTD., Fujian (CN)

(*) Notice: Subject to any disclaimer, the term of this patent is extended or adjusted under 35 U.S.C. 154(b) by 0 days.

(21) Appl. No.: 16/981,709

(22) PCT Filed: Apr. 16, 2019

(86) PCT No.: PCT/CN2019/082784
§ 371 (c)(1),
(2) Date: Sep. 17, 2020

(87) PCT Pub. No.: WO2020/062841
PCT Pub. Date: Apr. 2, 2020

(65) Prior Publication Data
US 2021/0035359 A1    Feb. 4, 2021

(30) Foreign Application Priority Data

Sep. 28, 2018 (CN) .......................... 201811142498.X

(51) Int. Cl.
*G06T 17/05* (2011.01)
*G02B 21/00* (2006.01)
*G06T 3/40* (2006.01)

(52) U.S. Cl.
CPC ............ *G06T 17/05* (2013.01); *G02B 21/008* (2013.01); *G06T 3/4038* (2013.01)

(58) Field of Classification Search
None
See application file for complete search history.

(56) References Cited

U.S. PATENT DOCUMENTS

| 6,023,056 A | 2/2000 | Fiete et al. |
| 2020/0059571 A1* | 2/2020 | Schock .............. H04N 1/00557 |

FOREIGN PATENT DOCUMENTS

| CN | 103852878 A | 6/2014 |
| CN | 105513018 A | 4/2016 |
| CN | 109272575 A | 1/2019 |

OTHER PUBLICATIONS

Hamamatsu, http://yiqi-oss.oss-cn-hangzhou.aliyuncs.com/aliyun/900102193/technical_file/file_277235.pdf, publication year 2011, all pages.*

* cited by examiner

*Primary Examiner* — Frank S Chen

(57) ABSTRACT

The invention disclosures a method for improving modeling speed of digital slide scanner, relates to the technical field of microscopes, the modeling speed is slow for image quality; and the focusing plane positions of the modeling points in modeling and in scanning imaging are different, which causes decrease of image quality, that is the question that higher requirement on motion repetition precision of the stage. The invention adopts modeling and scanning imaging in units of scanning lines, modeling and scanning the current line and modeling and scanning imaging the next line thereafter, wherein the modeling of the next line takes advantage of the time from the end of the current line to line feeding and returning to the beginning of the next line, during which the modeling is completed, which may parallel the modeling time with scanning and line feeding process, and effectively reduce the equivalent modeling time.

8 Claims, 4 Drawing Sheets

S1, going to the end of scanning line 1

S2, moving towards the beginning of scanning line 1, obtaining focusing plane positions of modeling points on the line and modeling

S3, moving towards the end of scanning line 1 after reaching the beginning of scanning line 1, and imaging according to the model on the line

S4, reaching the end of the current scanning line 1

S5, line feeding to the end of scanning line 2

S6, circulating...

S7, going to the end of scanning line N

S8, moving towards the beginning of scanning line N, obtaining focusing plane positions of modeling points on the line and modeling

S9, moving towards the end of scanning line N after reaching the beginning of scanning line N, and imaging according to the model on the line

S10, reaching the end of the current scanning line N

S11, completing scanning, seamlessly stitching, generating image

FIG. 4

METHOD FOR IMPROVING MODELING SPEED OF DIGITAL SLIDE SCANNER

TECHNICAL FIELD

The invention relates to the technical field of microscopes, in particular to a method for improving modeling speed of digital slide scanner.

BACKGROUND ART

Digital slide scanner is a precise instrument integrating optical, electron, computer and other multidisciplinary technologies, which collecting multiple continuous high-resolution microscopic images by controlling microscopy imaging system and the slide with certain regular motion, and stitching together to generate a high-resolution whole slide image (WSI, also known as virtual slide). After transforming the traditional slide into a high-resolution digital image, the user can browse the slide anytime and anywhere without the microscope on the computer or mobile device, with the advantages of never fading, easy to save, manage, and share, and free to zoom in and out when viewed in full viewing field. The digital slide scanner is widely used in fields such as pathological diagnosis, teaching and training, drug research and scientific research.

With the promotion of the application, the performance requirements of the scanner are getting higher and higher, especially the scanning quality and speed, in order to obtain better image quality, it is required to focus accurately on each viewing field, and usually a digitized slide needs to be photographed image on thousands of viewing fields, therefore the focus mode may affect the scanning speed. Traditionally, each viewing field is in focus, and although better image quality can be obtained, speed becomes a bottleneck.

The patent 201310549353.2 adopts single frame image focusing optimization, by analyzing focusing data for the current image Z of the same vision field image in a viewing field and focusing data for different image Z layers which are collected in the same viewing field, high quality scanning images can be obtained, however, the scanning speed performance is affected.

More method in the prior art for modeling by focusing plane such as the patent 201110283732.2, that is, selecting several viewing fields of the slide and calculating focusing plane positions as sampling points, according to the sampling points, focusing plane positions in each viewing field of the slide is estimated by algorithm, thereby, there is no need to move the Z-axis to collect multiple images to calculate the defocusing amount when scanning imaging, and only need to drive the Z-axis according to the modeled focusing plane positions, which can significantly increase the speed. However, the above technical scheme has the following defects, firstly, the image quality depends on the number of modeling points, the more the number thereof, the closer the focusing plane in model is to the actual focusing plane, the better the image quality, but the slower the modeling speed. Thereby the modeling speed is one of the main factors affecting modeling scanning time. Secondly, for the focusing plane model has been calculated before scanning, if there are errors in stage during scanning, for example, the focusing plane positions of the modeling points in modeling and in scanning imaging are different, may cause the image quality to decrease, thereby the motion repetition precision of the stage is highly required.

SUMMARY OF THE INVENTION

The invention aims to provide a method for improving modeling speed of digital slide scanner. The invention adopting modeling and scanning imaging in units of scanning lines, modeling and scanning the current line and thereafter modeling and scanning imaging the next line thereafter, wherein the modeling of the next line takes advantage of the time from the end of the current line to line feeding and returning to the beginning of the next line, during which the modeling is completed, which may parallel the modeling time with scanning and line feeding process, and effectively reduce the equivalent modeling time.

In order to achieve above technical objectives, the invention adopts following technical schemes:

dividing scanning area into multiple scanning lines when scanning camera scanning, scanning imaging each scanning line in sequence, seamlessly stitching together into a complete digital slide, the scanning of lines is in single-direction, that is, imaging is performed from the beginning of the line to the end of the line, returning to the beginning of the next line to be scanned after each line was scanned, simultaneously, obtaining focusing plane positions of the modeling points on the line to be scanned and modeling the same, and then the scanning imaging from the beginning of the line to the end of the line according to the model. Wherein the scanning camera is line scan camera or area-array camera.

In particular, the scanner first going to the end of the first scanning line, selecting multiple points on the first scanning line as modeling points, obtaining focusing plane positions of modeling points on the first line and modeling the same in the period of line feeding and returning to the beginning of the first scanning line, imaging the first line after reaching the beginning of the line and completing the modeling, after scanning imaging the line, the scanner directly line feeds to the end of the second scanning line, and modeling the second line (comprising selecting modeling points and obtaining the focusing plane positions of the modeling points) in the process of returning to the beginning of the second scanning line, and imaging the second line after reaching the beginning of the second line, and so on, modeling and scanning imaging the subsequent line until the imaging of all the lines in the scanning area are completed.

The position and number of modeling points used in the modeling of the line can be flexibly determined, and some of the lines are allowed to have no modeling points, preferably, at least one position is selected as a modeling point on each line.

Preferably, for those lines with modeling points thereon, when modeling a line, only the modeling points on the line can be selected, the modeling method can be piecewise linear fitting, polynomial fitting, etc. It also can be combined with existing modeling points, such as modeling points on the scanned line, or modeling points obtained in advance, and the modeling method can adopt triangular patch method, nonlinear polynomial method, and etc.

Preferably, for those lines with no modeling points thereon, and it can be combined with existing modeling points, such as modeling points on the scanned line, or modeling points obtained in advance, and the modeling method can adopt triangular patch method, nonlinear polynomial method, and etc.

Compared to the prior art, the invention, firstly, increases the modeling points and improves the scanning image quality without reducing the scanning speed; secondly, modeling and scanning imaging in units of scanning lines, with no accumulative errors and low requirements on the stage.

BRIEF DESCRIPTION OF THE DRAWINGS

The invention is further described with reference to the non-specified embodiments in accompanying drawings;

FIG. 4 shows the working processing of a method for improving modeling speed of digital slide scanner in the invention;

DETAILED DESCRIPTION OF THE PREFERRED EMBODIMENTS

In order to enable those skilled in the art to better understand the invention, the technical schemes of the invention will be further described below with reference to the accompanying drawings and embodiments.

Figure 1:
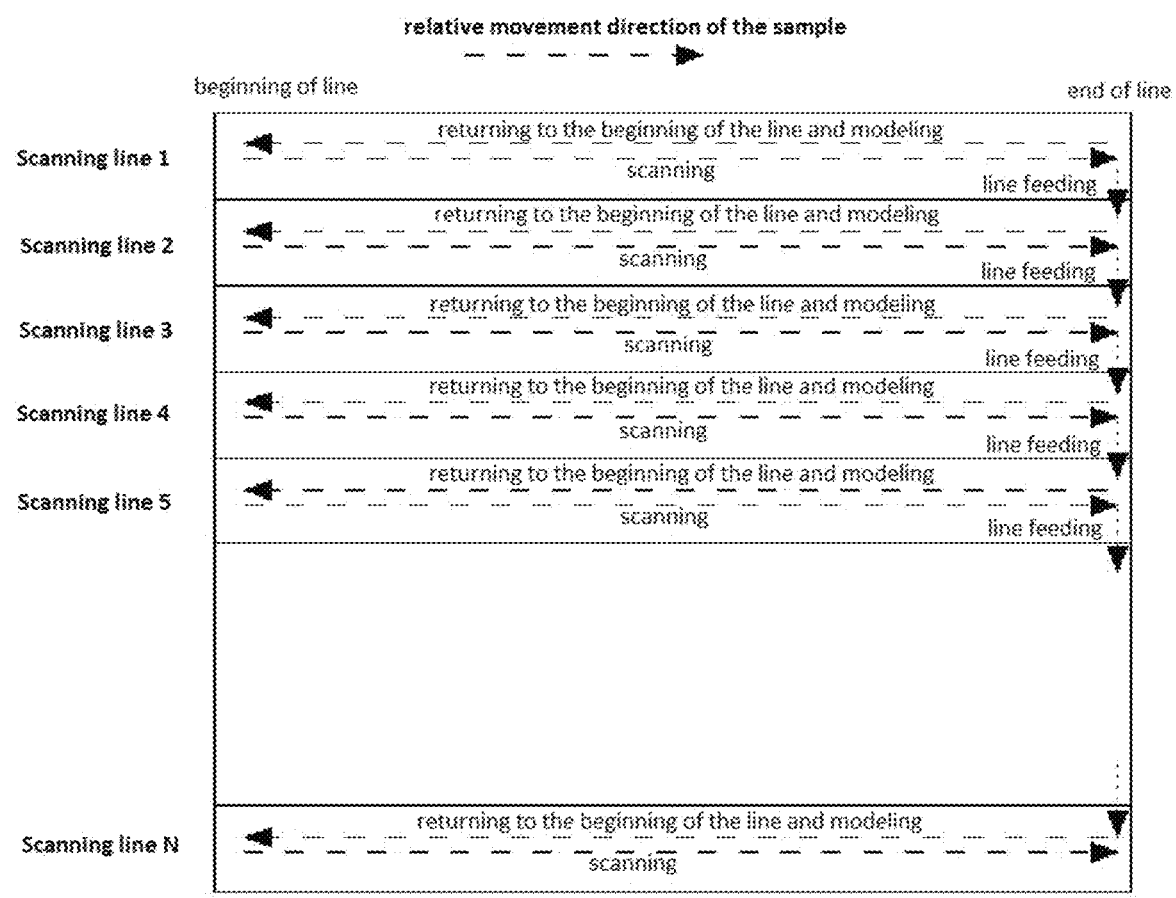
FIG. 1 shows a method base on line modeling and imaging of a method for improving modeling speed of digital slide scanner in the invention.
Figure 2:
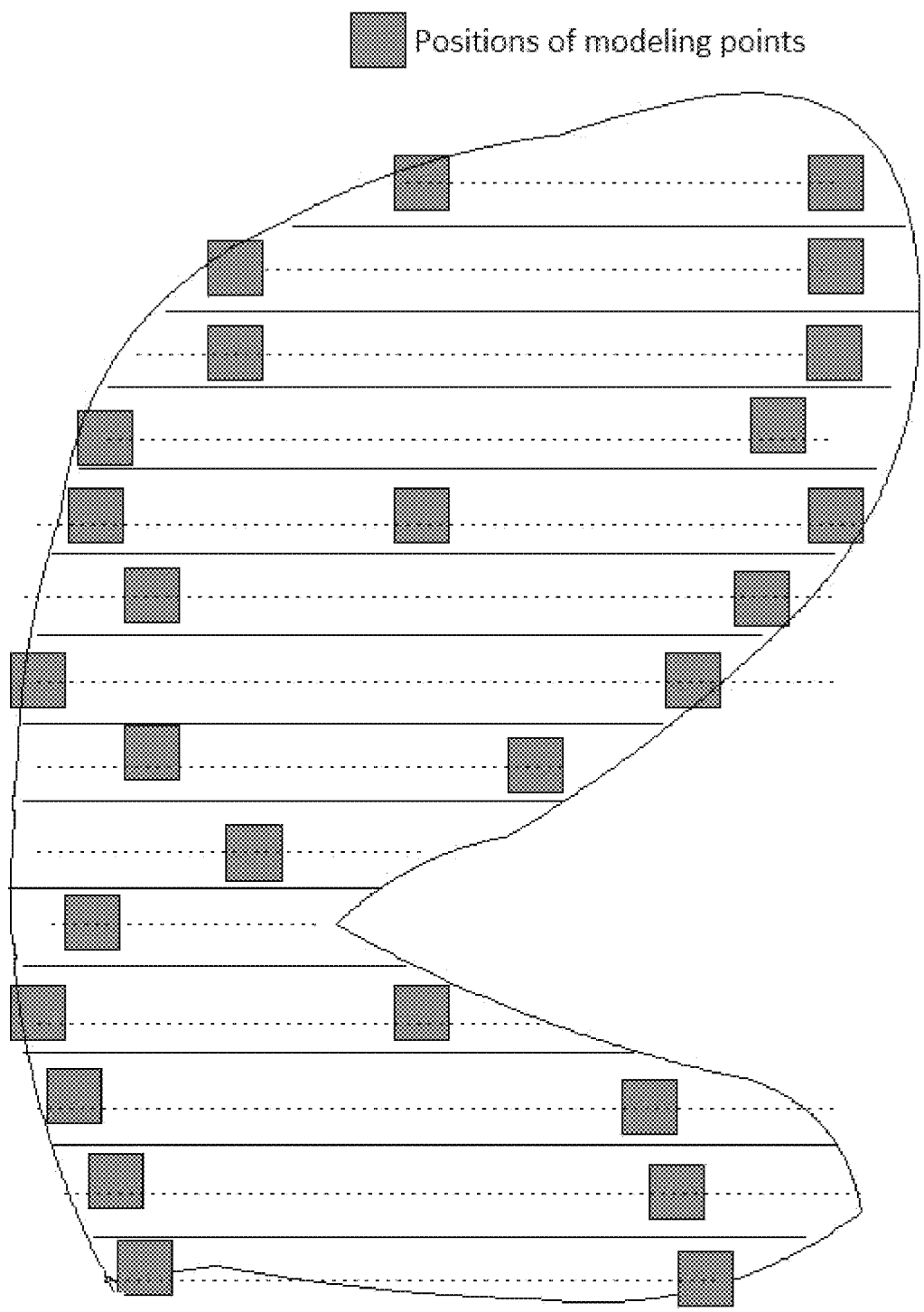
FIG. 2 shows modeling by adopting piecewise linear fitting and polynomial fitting of a method for improving modeling speed of digital slide scanner in the invention.
Figure 3:
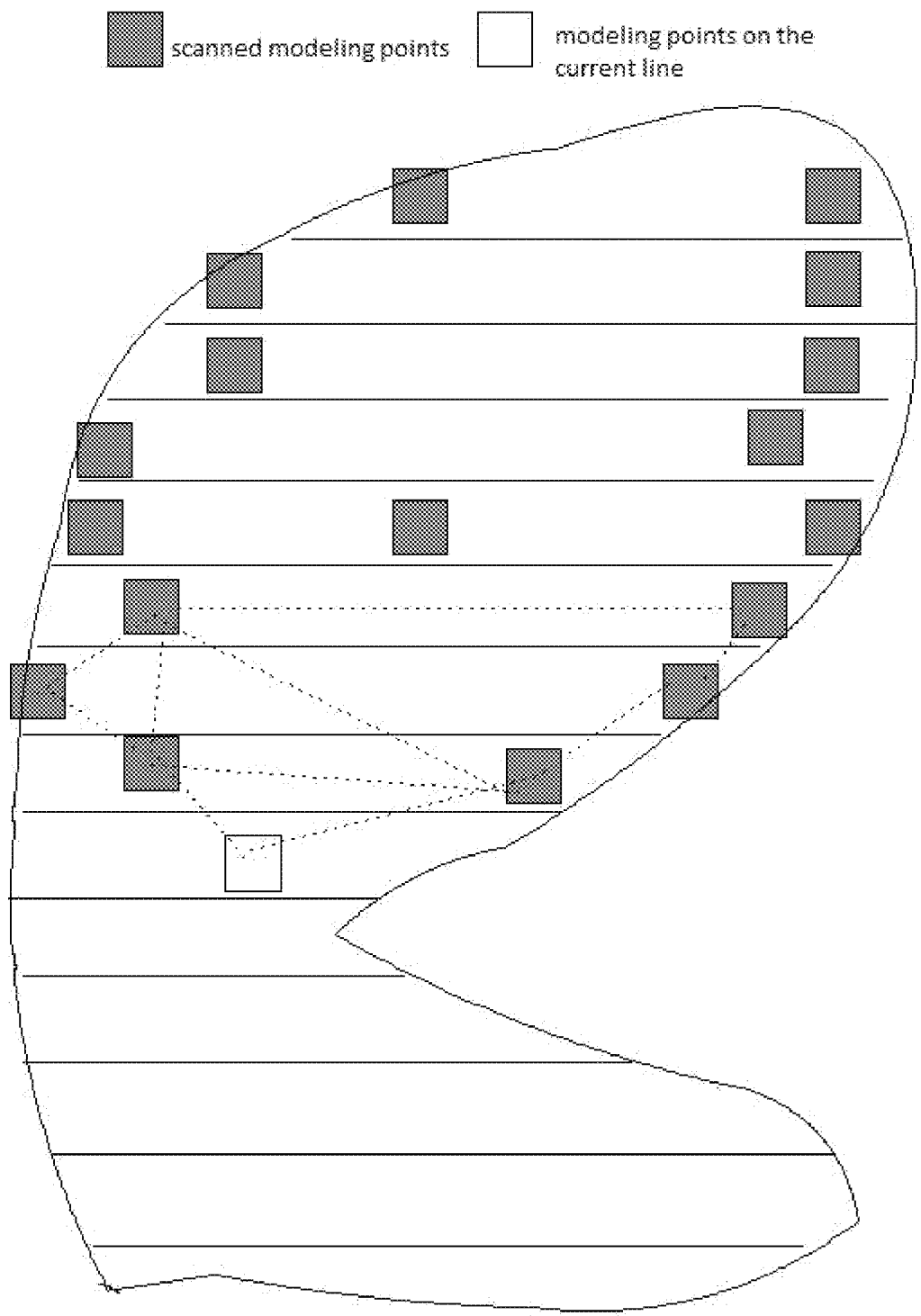
FIG. 3 shows modeling by adopting triangular patch method and nonlinear polynomial method of a method for improving modeling speed of digital slide scanner in the invention.

As shown in FIGS. 1, 2, 3 and 4, a method for improving modeling speed of digital slide scanner, adopting single-direction scanning imaging, modeling and scanning imaging in units of scanning lines, obtaining focusing plane positions of modeling points on next line and modeling the same in the period of line feeding and returning to the beginning of the next scanning line.

In particular, comprising the following steps:

Step 1, assembling equipment, comprising a stage, used for placing slide samples and driving slide samples to move along X axis and Y axis, the X axis and the Y axis are perpendicular to each other and form a horizontal plane; a lighting device, used for partially or fully illuminate the slide samples; an objective lens, used for observing the illuminated slide samples; Z axis controller, controlling the movement of the objective lens along the direction of Z axis to enable the objective lens to focus to obtain clear images of the slide samples, the Z axis is perpendicular to the X axis and the Y axis respectively along imaging optical axis of the automatic scanning system for microsections, the X axis, the Y axis and the Z axis constitute an orthogonal coordinate system; and it should be noted that the sample may not be placed on X or Y stage. It has only to ensure that the imaging system and the sample are moved orthogonally to each other, that is: only the X axis drives the sample to move, and the Y axis drives the imaging system to move in orthogonal direction.

Step 2, preparing sample, placing the sample on the stage and illuminating part or all area of the slide sample by the lighting device;

Step 3, computing the number of scanning line according to the obtained size of the viewing field and scanning area;

Step 4, imaging in single direction, modeling and scanning imaging in units of scanning lines, thereafter obtaining focusing plane positions of modeling points on next line and modeling the same in the period of line feeding and returning to the beginning of the next scanning line.

Preferably, when modeling a line, selecting the modeling points only on the line. The modeling method can be piecewise linear fitting, polynomial fitting, etc.

Preferably, when modeling a line, modeling points on the line and obtained modeling points on the previous line are combined. The obtained modeling points on the previous line are modeling points on the scanned line. In addition, the obtained modeling points on the previous line can also be the modeling points obtained in advance. The modeling method can adopt triangular patch method, nonlinear polynomial method, and etc.

Embodiment 1 as the preferred embodiment 1, the position and number of modeling points used in the modeling of the line are preferably be at least one position is selected as a modeling point on each line. For those lines with modeling points thereon, when modeling a line, only the modeling points on the line can be selected, the modeling method can be piecewise linear fitting, polynomial fitting, etc. It also can be combined with existing modeling points, such as modeling points on the scanned line, or modeling points obtained in advance, and the modeling method can adopt triangular patch method, nonlinear polynomial method, and etc. Dividing scanning area into multiple scanning lines when scanning camera scanning, scanning imaging each scanning line in sequence, seamlessly stitching together into a complete digital slide, the scanning of lines is in single-direction, that is, imaging is performed from the beginning of the line to the end of the line, returning to the beginning of the next line to be scanned after each line was scanned, simultaneously, obtaining focusing plane positions of the modeling points on the line to be scanned and modeling the same, and then the scanning imaging from the beginning of the line to the end of the line according to the model. Wherein the scanning camera is line scan camera or area-array camera.

Embodiment 2

As the preferred embodiment 2, the position and number of modeling points used in the modeling of the line, allowing some of the lines have no modeling points, for those lines with no modeling points thereon, and it can be combined with existing modeling points, such as modeling points on the scanned line, or modeling points obtained in advance, and the modeling method can adopt triangular patch method, nonlinear polynomial method, and etc. Dividing scanning area into multiple scanning lines when scanning camera scanning, scanning imaging each scanning line in sequence, seamlessly stitching together into a complete digital slide, the scanning of lines is in single-direction, that is, imaging is performed from the beginning of the line to the end of the line, returning to the beginning of the next line to be scanned after each line was scanned, simultaneously, obtaining focusing plane positions of the modeling points on the line to be scanned and modeling the same, and then the scanning imaging from the beginning of the line to the end of the line according to the model. Wherein the scanning camera is line scan camera or area-array camera.

The difference between the embodiment 1 and the embodiment 2 is that the embodiment 1 adopts piecewise linear fitting, polynomial fitting, triangular patch method, nonlinear polynomial method, and etc., to complete modeling the lines with modeling points thereon. Wherein, for those lines with no modeling points thereon, the embodiment 2 adopts triangular patch method and nonlinear polynomial method to complete modeling the lines with no modeling points thereon. The method for improving the modeling speed of the digital slide scanner provided by the invention is described in detail above.

The description of the specific embodiments is merely to assist in understanding the method and the core concept of the invention. It should be noted that various improvements and modifications of the invention can be made by those skilled in the art without departing from the principle of the invention, and these improvements and modifications should be included in the protection scope of the invention.

What is claimed is:

1. A method for improving modeling speed of digital slide scanner, adopting singledirection scanning imaging, and comprising: modeling and scanning imaging in units of scanning lines, obtaining focusing plane positions of modeling points on next line and modeling the same in the period of line feeding and returning to the beginning of the next scanning line;

the modeling method is adopted triangular patch method or nonlinear polynomial method;

the position and number of modeling points used in the modeling of the line can be flexibly determined, and some of the lines are allowed to have no modeling points, preferably, at least one position is selected as a modeling point on each line.

2. The method for improving modeling speed of digital slide scanner of claim 1, when modeling a line, selecting the modeling points only on the line.

3. The method for improving modeling speed of digital slide scanner of claim 2, the modeling method is piecewise linear fining or fitting of a polynomial.

4. The method for improving modeling speed of digital slide scanner of claim 2, wherein dividing scanning area into multiple scanning lines when scanning camera scanning, scanning imaging each scanning line in sequence, seamlessly stitching together into a complete digital slide, the scanning of lines is in single-direction, that is, imaging is performed from the beginning of the line to the end of the line, returning to the beginning of the next line to be scanned after each line was scanned, simultaneously, obtaining focusing plane positions of the modeling points on the line to be scanned and modeling the same, and then the scanning imaging from the beginning of the line to the end of the line according to the model.

5. The method for improving modeling speed of digital slide scanner of claim 4, the scanning camera is line scan camera or area-array camera.

6. The method for improving modeling speed of digital slide scanner of claim 1, when modeling a line, modeling points on the line and obtained modeling points on the previous line are combined.

7. The method for improving modeling speed of digital slide scanner of claim 4, the obtained modeling points on the previous line are modeling points on the scanned line.

8. The method for improving modeling speed of digital slide scanner of claim 6, the obtained modeling points on the previous line are modeling points obtained in advance.

\* \* \* \* \*